(12) United States Patent
Moyer et al.

(10) Patent No.: US 7,895,422 B2
(45) Date of Patent: Feb. 22, 2011

(54) SELECTIVE POSTPONEMENT OF BRANCH TARGET BUFFER (BTB) ALLOCATION

(75) Inventors: William C. Moyer, Dripping Springs, TX (US); Jeffrey W. Scott, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 384 days.

(21) Appl. No.: 12/040,204

(22) Filed: Feb. 29, 2008

(65) Prior Publication Data

US 2009/0222648 A1 Sep. 3, 2009

(51) Int. Cl.
G06F 9/38 (2006.01)
G06F 9/44 (2006.01)
(52) U.S. Cl. .................... 712/239; 712/240
(58) Field of Classification Search .................. 712/239, 712/240
See application file for complete search history.

(56) References Cited

U.S. PATENT DOCUMENTS

| | | | |
|---|---|---|---|
| 5,265,213 A | 11/1993 | Weiser et al. | |
| 5,732,235 A | 3/1998 | Kahle et al. | |
| 5,740,415 A | 4/1998 | Hara | |
| 5,748,976 A | 5/1998 | Taylor | |
| 5,857,089 A * | 1/1999 | Goddard et al. | 712/222 |
| 6,151,672 A | 11/2000 | Hunt | |
| 6,353,882 B1 * | 3/2002 | Hunt | 712/239 |
| 6,829,702 B1 * | 12/2004 | Jeremiah et al. | 712/241 |
| 6,895,498 B2 | 5/2005 | McDonald et al. | |
| 7,096,348 B2 | 8/2006 | Moyer et al. | |
| 7,107,437 B1 | 9/2006 | Padwekar | |
| 2002/0166042 A1 | 11/2002 | Almog et al. | |
| 2005/0120193 A1 | 6/2005 | Emma et al. | |
| 2005/0132173 A1 | 6/2005 | Moyer et al. | |
| 2006/0095750 A1 * | 5/2006 | Nye et al. | 712/240 |

OTHER PUBLICATIONS

U.S. Appl. No. 11/464,108, filed Aug. 11, 2006.
U.S. Appl. No. 11/464,112, filed Aug. 11, 2006.
U.S. Appl. No. 11/969,116, filed Jan. 3, 2008.
Office Action mailed May 26, 2010 in U.S. Appl. No. 12/040,210.

* cited by examiner

Primary Examiner—Daniel Pan
(74) Attorney, Agent, or Firm—Joanna G. Chiu; Robert L. King (57) ABSTRACT

A system and method provides branch target buffer (BTB) allocation. When a branch instruction is received, a branch target address that corresponds to the branch instruction is determined. A determination is made whether the branch target address is presently stored in a branch target buffer (BTB). When the branch target address is not presently stored in the branch target buffer, an entry in the branch target buffer is identified to receive the branch target address. A value in a field within the identified entry in the branch target buffer, such as a postponement flag (PF), is used to selectively override a replacement decision defined by predetermined branch target buffer allocation criteria. In one form, if a branch is taken, the identified entry is replaced with the branch target address in response to determining that the value in the field within the identified entry has a predetermined value.

20 Claims, 6 Drawing Sheets

| STATE OF EXISTING ENTRY PREDICTOR | CYCLE SAVINGS OF NEW BRANCH RELATIVE TO EXISTING ENTRY | | |
|---|---|---|---|
| | < 1 | = (1 CYCLE) | = (2 CYCLES) | > 2 CYCLES |
| 00 – SNT | R | R | R | R |
| 01 – WNT |  | R | R | R |
| 10 – WT |  |  | R | R |
| 11 – ST |  |  |  | R |

FIG. 7

| STATE OF EXISTING ENTRY PREDICTOR | CYCLE SAVINGS OF NEW BRANCH RELATIVE TO EXISTING ENTRY | | |
|---|---|---|---|
| | < 1 | = (1 CYCLE) | = (2 CYCLES) | > 2 CYCLES |
| 00 – SNT | R | R | R | R |
| 01 – WNT | R | R | R | R |
| 10 – WT | R |  | R | R |
| 11 – ST |  |  | R | R | ns
SELECTIVE POSTPONEMENT OF BRANCH TARGET BUFFER (BTB) ALLOCATION

CROSS-REFERENCE TO RELATED APPLICATION(S)

This application is related to Ser. No. 12/040210, filed on even date, entitled "Metric For Selective Branch Target Buffer (BTB) Allocation," naming William C. Moyer and Jeffrey W. Scott as inventors, and assigned to the current assignee hereof.

BACKGROUND

1. Field

This disclosure relates generally to data processing systems, and more specifically, to using one or more metrics for selective BTB allocation.

2. Related Art

Branch target buffers have been used extensively to improve processor performance by reducing the number of cycles spent in execution of branch instructions. Branch target buffers act as a cache of recent branches and accelerate branches by providing either a branch target address (address of the branch destination) or one or more instructions at the branch target prior to execution of the branch instruction, which allows a processor to more quickly begin execution of instructions at the branch target address.

Branch lookahead schemes are also used to accelerate branch processing, and operate by scanning ahead into the sequential instruction stream, looking for upcoming branch instructions in advance of their execution, and computing branch target addresses of branches early, to allow branch target instructions to be fetched in advance of branch instruction execution, in case the branch is taken.

Branch prediction logic may be used with both BTB and branch lookahead schemes to allow for an early prediction of the outcome (taken or not taken) of a conditional branch, prior to the resolution of the branch condition, thus allowing for increased branch performance when accuracy of the predictor is high.

Many current branch target buffer designs use an allocation policy that allocates an entry for every branch instruction encountered in the instruction stream. This approach tends to be inefficient, since not taken branches are likely to be not taken in the future, and allocating an entry for them may displace future taken branch entries, thus lowering the hit rate of the branch target buffer.

Another approach waits to allocate an entry in the branch target buffer until it is known that a branch is actually taken, since a not-taken branch has a high probability of not being taken on the next execution. For larger branch target buffers, this may be a reasonable approach, however, for low-cost systems where the size of the branch target buffer must be minimized, an improved method of allocating new entries in the branch target buffer is desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In various embodiment described herein, allocation of a taken branch in a branch target buffer (BTB) may be conditioned on a variety of different criteria. In one embodiment, the decision whether to allocate the taken branch in the BTB is based on information of the entry that is identified to be replaced in the BTB for allocation. For example, the decision whether to allocate may be based on a branch predictor state of the identified entry to be replaced. In one embodiment, the decision may be based on cycle saving information of the new branch that is to be allocated into the BTB, such as on the cycles that could be saved on a subsequent access to the new branch if that new branch were in the BTB. In one embodiment, when a new branch is allocated into the BTB, this cycle savings information is stored as well. In this manner, the decision of whether or not to allocate may instead be based on a relative cycle saving between the new branch to be stored upon allocation into the BTB and the branch in the identified entry to be replaced upon allocation. Alternatively, other criteria may be used or a combination of these or other criteria can be used. Also, one embodiment allows for the use of a postponement flag which actually allows for the replacement of an entry in the BTB identified for replacement upon allocation to be postponed.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

Figure 1:
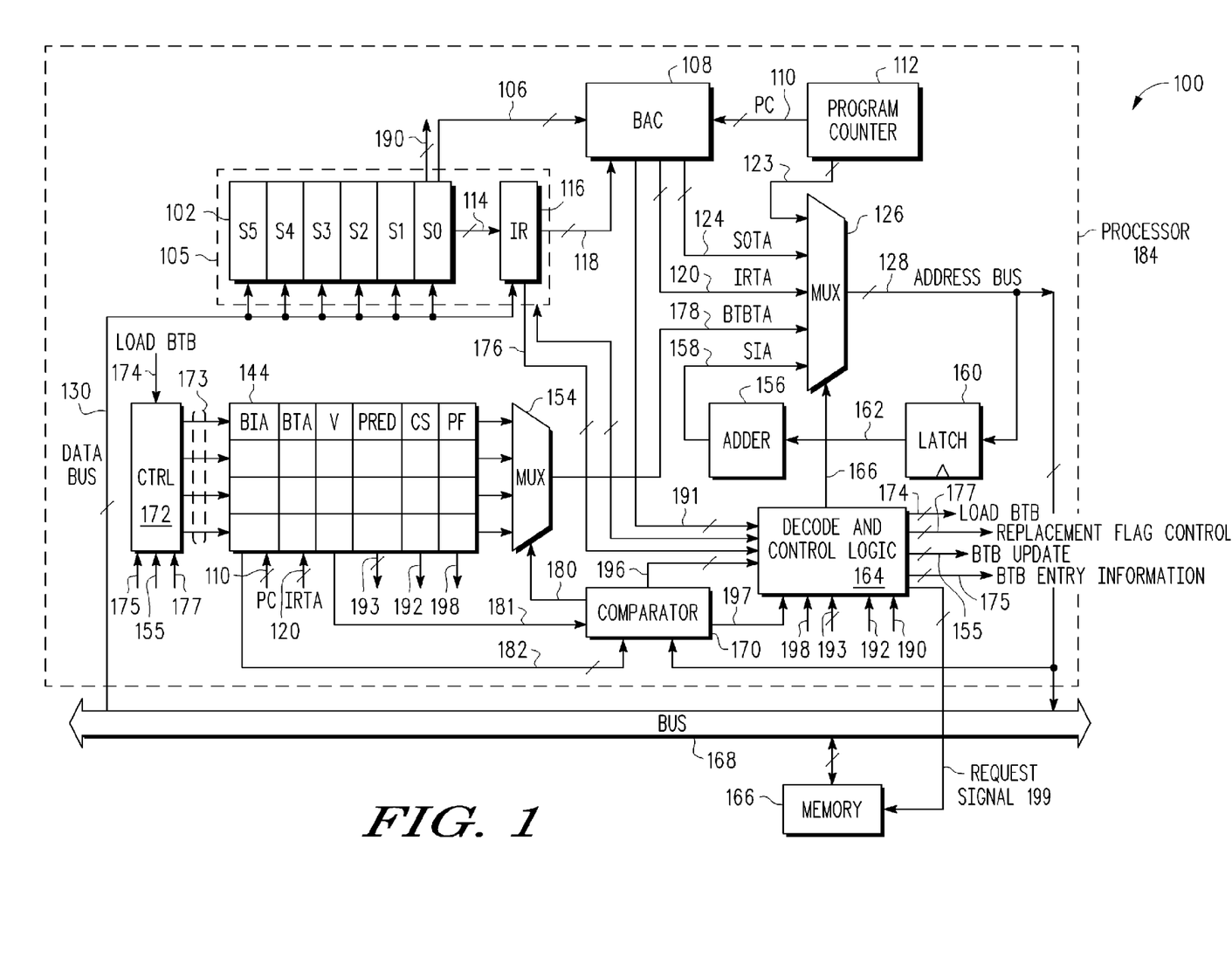
FIG. 1 illustrates, in block diagram form, a data processing system having a BTB in accordance with one embodiment of the present invention.

FIG. 1 illustrates, in block diagram form, a data processing system 100 in accordance with one embodiment of the present invention. Data processing system 100 includes memory 166, bus 168, and processor 184. Data processing system 100 may include other elements than those illustrated, or may include more or fewer elements than those illustrated. For example, data processing system 100 may include any number of memories, peripheral devices, or processors.

Processor 184 includes an instruction register (IR) 116, a branch address calculator (BAC) 108, a program counter 112, a multiplexer (MUX) 126, a latch 160, an adder 156, a multiplexer (MUX) 154, a branch target buffer (BTB) 144, decode and control logic (DCL) 164, instruction buffer 105, comparator 170, control logic 172, and prefetch buffer 102. Prefetch buffer 102 includes instruction slots S0, S1, S2, S3, S4, and S5. Instruction buffer 105 includes prefetch buffer 102 and instruction register 116. Processor 184 may be any type of processor, such as, for example, a microprocessor, microcontroller, digital signal processor, etc. In one embodiment, processor 184 may be referred to as a processor core. In another embodiment, processor 184 may be one of many processors in a multi-processor data processing system. Furthermore, processor 184 may be a pipelined processor.

Still referring to FIG. 1, prefetch buffer 102 is coupled to BAC 108, DCL 164, instruction register 116, and bus 168. BAC 108 is coupled to MUX 126, program counter 112, prefetch buffer 102, and instruction register 116. MUX 126 is coupled to program counter 112, BAC 108, MUX 154, adder 156, latch 160, and bus 168. BTB 144 is coupled to CTRL 172, comparator 170, and MUX 154. Comparator 170 is coupled to MUX 154, BTB 144, address bus 128, and DCL 164. DCL 164 is coupled to MUX 126, instruction register 116, comparator 170, prefetch buffer 102, memory 166, and CTRL 172. Memory 166 is coupled to bus 168 and DCL 164.

In operation, memory 166 contains a sequence of instructions, each instruction having a corresponding instruction address. During a clock cycle of processor 184, DCL 164 determines whether instruction buffer 105 has a predetermined number of slots available to store a predetermined number of instructions from memory 166. DCL 164 is able to determine whether there will be a predetermined number of slots available in instruction buffer 105 because DCL 164 is cognizant of the size of prefetch buffer 102, the number of reserved slots in instruction buffer 105, and the number of instructions currently being fetched from memory via bus 168. The predetermined number of slots may vary depending upon the pipelined processor being used and is dependent on the number of instructions fetched and the size of each instruction being fetched. For ease of explanation herein, it will be assumed that processor 184 uses a doubleword fetch size, the predetermined number of slots is two, and the predetermined number of instructions being fetched is two (i.e., two word-size instructions are requested during each doubleword instruction fetch). Alternate embodiments may use a different number of prefetch slots, may have a different pipeline, and may have different fetch sizes and memory latency than the embodiments described herein.

In one embodiment, prefetch buffer 102 is used to hold sequential instructions in advance of their execution by processor 184. Instruction register 116 is used to hold the current instruction being decoded for execution. As instructions are executed, subsequent instructions are provided to instruction register 116 by way of conductors 114 from prefetch buffer slot 0, or from data bus 130. As these instructions advance through the pipeline, fetched instructions are shifted into slot 0 from slot 1, are shifted into slot 1 from slot 2, and so forth, assuming valid instructions are present in a previous slot. Empty slots in prefetch buffer 102 may be filled with requested instructions fetched from memory 166 by way of bus 168 and data bus 130.

In one embodiment of the present invention, branch address calculator 108 may be used to determine the slot 0 target addresses of the instructions in slot 0 (S0) in prefetch buffer 102 and the instruction register target address of the instruction in instruction register 116. For example, during a clock cycle, branch address calculator 108 receives the displacement fields of the instruction stored in S0 of prefetch buffer 102 and instruction register 116 and the address of the instruction currently being executed from program counter PC 112. Branch address calculator 108 then calculates the slot 0 target address (S0TA 124) of the instruction in slot 0 and the instruction register target address (IRTA 120) of the instruction in instruction register 116. Either of IRTA, S0TA, etc. may be selected when DCL 164 determines whether an instruction stored in instruction buffer 105 and/or an instruction stored in slot 0 (S0) of prefetch buffer 102 is a branch instruction.

Prefetch buffer 102 allows for decoupling of memory 166 from instruction register 116, and acts as a first-in first out (FIFO) queue of instructions. As long as the instruction execution stream remains sequential without a change of instruction flow, instructions continue to be requested sequentially and supplied to prefetch buffer 102. When a change of flow occurs (such as due to a change of flow instruction), the sequential instruction stream must be discarded, and prefetch buffer 102 is flushed of unused sequential instructions and is filled with a new stream of instructions from the target location of the change of flow. Branch instructions are typically used in processor 184 to cause a change of flow to occur to a new instruction stream, although additional events such as interrupts and exception processing may also cause a change of flow to occur. Change of flow events cause a disruption in the normal execution of instructions in processor 184 since the current instruction stream is discarded, and a new instruction stream established. This may cause processor 184 to stall instruction execution for one or more cycles while waiting for the new instruction stream to be established, thus possibly lowering overall performance and efficiency of data processing system 100.

Also, the contents of prefetch buffer 102 may be examined to determine the presence of a branch instruction which may cause a change of flow, in advance of the execution of the branch instruction by processor 184. By examining the instruction stream in advance of execution, it is possible that a branch instruction may be detected early enough before it is executed that the target instruction stream can be established in advance in order to minimize processor 184 stalls, thus possibly improving execution efficiency of data processing system 100. This is known as performing "branch lookahead". The depth of lookahead required to avoid stall conditions is a function of the processor pipeline depth and memory access latency, and may vary in different embodiments of the current invention. Note that multiple branch instructions may be present in instruction register 116 and prefetch buffer 102 at any given time; therefore, DCL 164 may prioritize the selection of the branch target stream to be accessed. In one embodiment, DCL 164 scans instruction register 116 for a branch instruction first, and then scans prefetch buffer 102 slot 0 for a branch instruction, since this represents the logical order of instructions in the instruction stream. If a branch instruction is found in a higher priority location (e.g. instruction register 116), those in lower priority locations are temporarily ignored.

In the illustrated embodiment, the lookahead depth is equal to one instruction prior to the branch instruction reaching the instruction register 116 for execution. In one embodiment, if the branch target can be calculated and an access request made to memory to obtain the target instruction stream one instruction cycle prior to the branch reaching the instruction register for execution, a stall may be avoided. This can be accomplished if the branch instruction is detected in slot 0 (S0) of prefetch buffer 102, since another instruction will be preceding it, namely that in instruction register 116. In this case, the branch target may be calculated, and a request made to memory to obtain the target instruction, which will arrive back to processor 184 in time to avoid additional execution stall cycles due to the delay incurred in accessing the target instruction stream.

However, it may be possible that not every branch instruction will be detectable in slot 0 of prefetch buffer 102, since branch instructions may bypass slot 0 and be loaded directly into instruction register 116 via data bus 130. This may occur when a change of flow occurs, and the target instruction itself is a branch instruction. Since the target instruction will be loaded directly into instruction register 116, it will not have been resident in slot 0 of prefetch buffer 102, and thus there will not have been an opportunity to fetch the target of that branch instruction early enough to avoid stalling processor 184. There may also be other reasons for a branch instruction to not hit slot 0 of prefetch buffer 102. For example, a data processing system with a unified memory bus could drain the instruction buffer 105 while executing consecutive load/store instructions or when waiting on instructions to arrive from memory 166. A subsequent fetch to fill the instruction register and slot 0 after execution of the load/store instructions in the instruction buffer 105 could result in a subsequent branch instruction not to be processed in slot 0 of the prefetch buffer 102. Therefore, using branch lookahead with the prefetch buffer 102 may not be sufficient to avoid stalls within processor 184 caused by change of flows.

Note that even if a branch instruction can be loaded into slot 0 of instruction buffer 105, there may not be an opportunity to begin fetching the target stream for that particular branch instruction, since it is possible that a different branch instruction is also present in instruction register 116. In this case, in one embodiment, the earlier branch in instruction register 116 will be given higher priority for memory access, even though the earlier branch may not actually be taken if the branch condition is resolved to indicate "not taken." In this case, the target instruction stream for the first branch will be discarded, but the opportunity for fetching the target stream for a following branch which is resident in slot 0 of prefetch buffer 102 will have been missed.

It can be seen that using the branch lookahead technique can reduce processor 184 stall conditions if an upcoming change of flow instruction can be detected early enough, and a request made to memory to fetch the target stream, but there are frequent cases where it cannot. For these cases, a branch target buffer may be used to accelerate access to the target stream of a branch instruction. In one embodiment, BTB 144 holds precalculated target addresses for branch instructions which have been previously stored in the BTB. In one embodiment, each BTB entry in BTB 144 includes a branch instruction address (BIA), a branch target address (BTA), a valid (V) field, a prediction state (PRED) field, a cycles saved (CS) field, and a postponement (PF) field. In one embodiment, within each BTB entry, the BTA is the target address corresponding to the BIA, the V field indicates whether the entry is valid or not, the PRED field indicates whether the BIA corresponds to a strongly taken (ST), a weakly taken (WT), a weakly not taken (WNT), or a strongly not taken (SNT) branch, the CS field indicates a number of cycles saved by the entry, and the PF field indicates if allocation of the entry has been previously postponed. These fields will be discussed in more detail below. Alternatively, note that PRED, CS, and PF may not be present in the BTB entries.

Since calculation of the target address requires time, in one embodiment, a target address can be provided by BTB 144 one or more clock cycles earlier than if the branch lookahead technique is used. For each instruction address provided to address bus 128 via MUX 126, comparator 170 performs a lookup to determine if the instruction address hits within BTB 144 (i.e. if the instruction address matches the BIA of an entry which is marked as valid by the V field) and asserts BTB entry hit signals 196 to DCL 164 to indicate the hitting entry for later updating of the PRED information. If the hitting entry is also indicated to be a taken branch (i.e. if the PRED field indicates ST or WT), comparator 170 asserts comparator match signal 197. The target address corresponding to the instruction address which hit in BTB 144 is obtained from the BTA field of the matching entry, and a memory request may then be made to obtain the target instruction. In this case, MUX 154 selects the appropriate entry from BTB 144 via control signal 180 sent by comparator 170, such that MUX 154 provides the BTA of the matching entry, BTBTA 178, to MUX 126. As will be described in more detail below, DCL 164, in response to assertion of the comparator match signal 197, provides control signal 166 to MUX 126 to select BTBTA 178 and provide it to address bus 128 so that it may be provided to memory 166 via bus 168. Thus, if there is a hit in BTB 144 and the prediction from the hitting entry indicates "taken" (e.g. ST or WT), the target instruction stream can be established prior to the branch arriving into prefetch buffer 102 or instruction register 116. However, note that it is also possible that the incoming instruction address which results in a hit within BTB 144 may not actually turn out to be a branch instruction. In this case, known techniques may be used to correct the instruction stream and pipeline, as needed.

Figure 2:
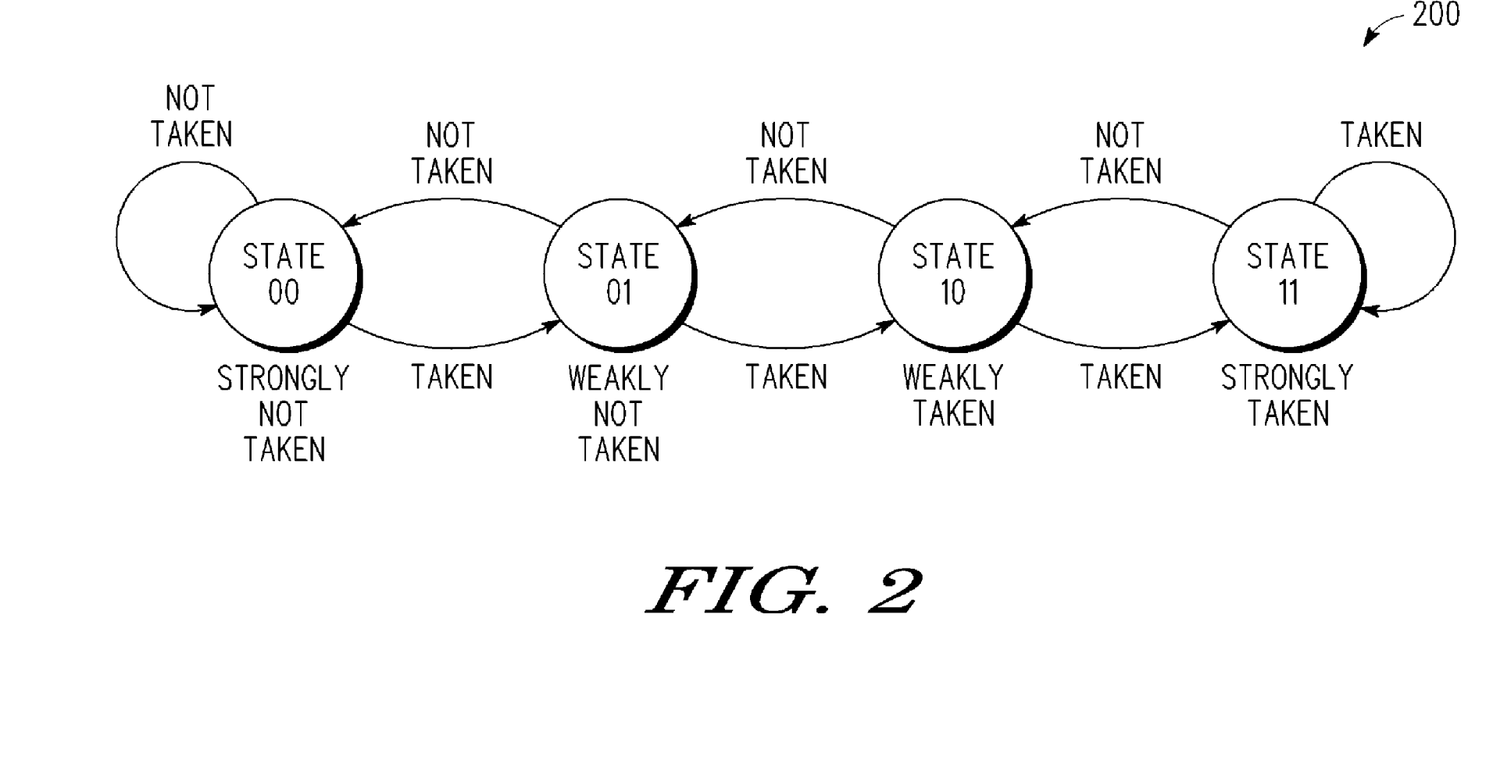
FIG. 2 illustrates a state diagram for updating a predictor field in BTB.

Also, when an instruction address which resulted in a hit in BTB 144 is determined to be a branch and is resolved as taken or not taken, the corresponding PRED field in the entry that matches that branch instruction is updated according to the state diagram of FIG. 2 via BTB update signals 155 from DCL 164 to control 172. Note that FIG. 2 illustrates a state diagram 200 for prediction states of each entry within BTB 144. Note that the state diagram includes four states: state 00 (SNT), state 01 (WNT), state 10 (weakly taken), and state 11 (strongly taken). Note that when the branch is resolved as taken the current state is changed to the state which appears immediately to the right of the current state in the state diagram, and when the branch is resolved as not taken, the current state is changed to the state which appears immediately to the left of the current state in the state diagram. If the PRED field already indicates state 11 and the branch which caused a hit of that entry is resolved as taken, then the PRED field remains in the same state. Similarly, if the PRED field already indicates state 00 and the branch which caused a hit of that entry is resolved as not taken, then the PRED field remains in the same state. Note that alternate embodiments may include more or less prediction states, and may cycle through the states differently. Any prediction scheme may be used. Furthermore, in one embodiment, the prediction scheme for branches may be implemented outside of BTB 144, such as within DCL 164, where BTB 144 may not include PRED fields. In another alternate embodiment, no branch prediction scheme may be used at all within processor 184.

Upon a branch instruction being resolved as taken (where this branch instruction did not result in a hit in BTB 144), it is determined whether it is to be allocated. In one embodiment, for a BTB allocation, an entry in BTB 144 is first identified for replacement, and, if the new taken branch is to be allocated, it is stored in the entry that was identified for replacement. In one embodiment, an entry of BTB 144 is identified for replacement using any known method, such as, for example, a least recently used (LRU) algorithm, a modified LRU algorithm, a round robin algorithm, etc. However, once an entry is identified for replacement, it is then determined whether or not the replacement (i.e. the allocation) is to occur. That is, DCL 164 can selectively allocate a new taken branch based on a variety of different factors, such as, for example, cycle saving information, predictor state information, postponement information, or combinations thereof. (Although, in the examples described herein, only taken branches are selectively allocated into BTB 144, alternate embodiments may selectively allocate, based on particular criteria, all resolved branches into BTB 144, including those resolved as not taken.)

In one embodiment, DCL 164 uses cycle saving information to determine whether or not a taken branch which did not hit in BTB 144 (i.e. which missed in BTB 144) is to be allocated an entry in BTB 144. (Note that the term "cycle" may also be referred to as a data processor cycle, a processor cycle, or a clock cycle.) This cycle saving information may refer to cycle saving information relating to the branch instruction stored within the entry that has been identified for replacement, or to the new taken branch that is to be selectively allocated, or to a relative measurement of cycle savings between the two. In one embodiment, each time DCL 164 determines that a branch instruction should be allocated an entry in BTB 144 (regardless of the criteria used to make this determination), then its corresponding cycle savings information is also stored within the allocated entry in the CS field. In one embodiment, DCL 164 determines the number of cycles that would be saved on a subsequent access of the new branch instruction if that instruction were stored in BTB 144 and provides this number via BTB entry information 175 to control 172 such that when load BTB 174 is asserted by DCL 164 to store the new branch instruction in BTB 144, the number of cycles saved can also be stored in the CS field of the entry. In an alternate embodiment, BTB 144 may not include the CS field, in which case this cycle savings information may be stored elsewhere, outside of BTB 144.

In one embodiment, DCL 164 determines a number of cycles (or an estimated number of cycles) that would be saved on a subsequent access of the branch instruction if that branch instruction were stored in BTB 144. In this example, DCL 164 may choose to allocate an entry for the taken branch only if the cycle saving is above a predetermined threshold. In another embodiment, the determination of whether or not to allocate an entry in BTB 144 may be made by comparing cycle saving information relating to the taken branch that is to be allocated versus the cycle saving information relating to the branch in the entry of BTB 144 that would be replaced with this new allocation. For example, DCL 164 may determine a difference between a savings in data processing cycles obtained by a presently stored target address in the entry to be replaced and a savings in data processing cycles that would be realized in response to a subsequent access of the branch target address if that branch target address were allocated or stored in that entry. In this example, DCL 164 may allocate the branch instruction only if the difference is greater than a predetermined threshold. Also, note that the cycle saving information relating to the branch in the entry of BTB 144 that would be replaced can be provided by CS 192 to DCL 164, where CS 192 provides the value of the CS field corresponding to the entry identified for replacement. In yet another embodiment, the determination of whether or not to allocate an entry in BTB 144 may be made based on the cycle saving information corresponding to the branch instruction of the entry that would be replaced upon allocation. This information can be provided by CS 192 to DCL 164. In this example, DCL 164 may allocate the branch instruction only if the cycle saving information corresponding to the branch instruction already stored in the entry to be replaced is less than a predetermined threshold.

Therefore, different types of cycle saving information may be used to determine whether a branch that is determined to be a taken branch is allocated into BTB 144. The cycle saving information may include, for example, cycle saving information related to the branch instruction already stored in the entry to be allocated, cycle saving information related to the taken branch instruction that is to be allocated into BTB 144, or a relative measurement of cycle savings between the taken branch instruction that is to be allocated and the branch instruction already stored in BTB 144 that would be replaced by the allocation of the taken branch instruction. In one embodiment, the cycle savings information may be based on the number of processor stall cycles which may be saved if the entry hits in BTB 144 on a future lookup, or may be based on other performance or power related factors, such as the number of memory accesses saved by obtaining the branch target address from the BTB. In some embodiments, minimizing the number of stall cycles may be an important performance criteria, but in other embodiments, minimizing bus utilization of bus 168, minimizing the number of instruction fetch cycles to memory 166, or minimizing the number of discarded instruction prefetches may be of primary importance, particularly if there is a direct correspondence to overall power consumption. Any of these cycle savings information may be stored within BTB 144 or elsewhere within system 100. The cycle savings information may also be a function of one or more of these factors in a weighted combination, where the weightings of each factor may be predetermined, or may be dynamically determined as the execution performed by system 100 occurs. The dynamic determination may be made by profiling hardware or software contained within system 100.

In yet another embodiment, the determination of whether or not to allocate an entry in BTB 144 may be made based on a prediction state of the entry in BTB 144 to be replaced by the taken branch. As described above, the PRED field of each entry may indicate whether the corresponding branch instruction address is predicted to ST, WT, WNT, and SNT. In one embodiment, the taken branch is allocated only if the entry in BTB 144 to be replaced is indicated to be WNT or SNT by its corresponding PRED field. Alternatively, the taken branch is allocated only if the entry in BTB 144 to be replaced is indicated to be WNT, SNT, or WT by its corresponding PRED field.

Figure 6:
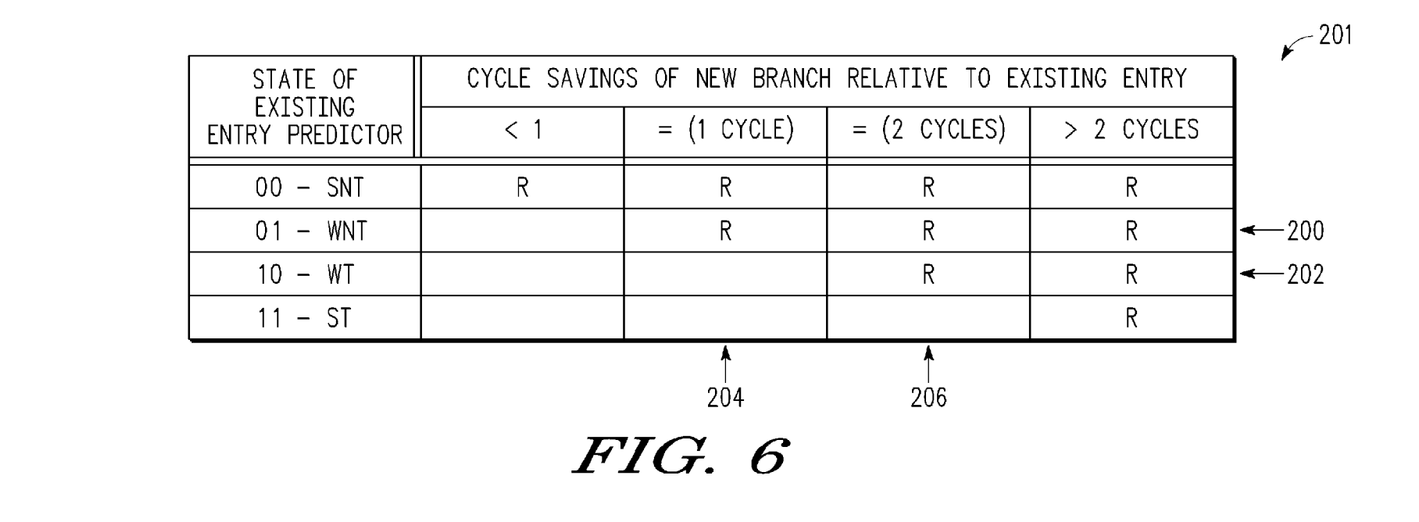
FIGS. 6 and 7 illustrate allocation decision tables in accordance with various embodiments of the present invention.

In one embodiment of the present invention, the determination of whether or not to allocate an entry in BTB 144 is based on both cycle savings information and the prediction state of the entry in BTB 144 to be replaced. For example, FIG. 6 illustrates an allocation decision table 201 that may be implemented by DCL 164, which, based on particular factors, provides criteria used to determine whether or not to replace the identified entry of BTB 144. Therefore, each entry in table 201 corresponds to a replacement decision for a particular criteria or set of criteria. For example, if the identified entry of BTB 144 that is to be replaced if the new branch instruction is to be allocated in BTB 144 has a PRED field value of 00 (indicating SNT), then regardless of the relative cycle savings of the new branch relative to the existing entry, allocation is performed. In this case, the new branch instruction which was resolved as taken is stored in the identified entry of BTB 144, along with its corresponding cycle saving value in the CS field (where again, the cycle saving value corresponds to the number of processor cycles, or estimate thereof, that would be saved if the branch instruction were stored in BTB 144). However, if the identified entry of BTB 144 that is to be replaced has a PRED value of 01 (indicating WNT), 10 (indicating WT), or 11 (indicating ST), then allocation selectively occurs based on the cycle savings of the new branch relative to the existing entry. For example, in these cases, DCL 164 determines a number of processor cycles, or an estimate thereof, that would be saved if the branch instruction were stored in BTB 144 and subtracts the CS value of the identified entry (provided by CS 192). According to table 201, if the PRED field is 01 and that difference is 1 or more, then replacement occurs. If the PRED field is 10 and that difference is 2 or more, then replacement occurs. If the PRED field is 11 and that difference is greater than 2, then replacement occurs. If the PRED field is 00, then replacement always occurs.

Therefore, note that in the embodiment of FIG. 6, the more likely that a branch instruction currently stored in the identified entry for replacement of BTB 144 is to be taken upon a subsequent access, the more difficult it becomes to allow a new taken branch to replace it. For example, if the branch instruction currently stored in the identified entry is predicted to be ST, then the new branch instruction should allow for a savings of more than 2 processor cycles more than the currently stored branch instruction before the replacement is allowed to occur. Alternate embodiments may use different table formats and different combinations of factors to make the determination of whether or not to allocate (i.e. to make the replacement decisions). For example, in one embodiment, table 201 may include only a single row, where only the cycle savings of the new branch relative to the existing entry is taken into consideration and not the predictor state. In this example, the table may include a single row which is similar to row 200 or 202 of table 201, in which the decision to replace an existing entry is based on whether at least a predetermined threshold number of cycles is saved. In another example, table 201 may include only a single column, where only the predictor state of the existing entry is taken into consideration and not the relative cycle savings. In this example, the table may include a single column which is similar to column 204 or 206 of table 201. Another embodiment is provided with the table of FIG. 7, which will be described in more detail below.

In one embodiment of the present invention, branch address calculator 108 may be used to determine the slot target addresses of the instructions in prefetch buffer 102 and the instruction register target address of the instruction in instruction register 116. For example, during a clock cycle, branch address calculator 108 receives the displacement fields of the instructions stored in prefetch buffer 102 and instruction register 116 and the address of the instruction currently being executed from program counter PC 112. Branch address calculator 108 then calculates the slot 0 target address (S0TA) of the instruction in slot 0 and the instruction register target address (IRTA) of the instruction in instruction register 116. Either of IRTA, S0TA, etc. may be selected when DCL 164 determines that an instruction stored in instruction buffer 105 is a branch instruction, as will be described further below.

Operation of at least one embodiment of the present invention shown FIG. 1 will be described below referencing timing diagrams shown in FIG. 3, FIG. 4, and FIG. 5. It is assumed that at the beginning of the first clock cycle of each of the timing diagrams shown in FIG. 3 and FIG. 4, load BTB 174 and comparator match signal 197 are deasserted. Also, note that, for FIG. 3, it is assumed that the branch instruction, BR $30, stored at address $8 misses in BTB 144, but for FIG. 4, it is assumed that the branch instruction hits in BTB 144.

Figure 3:
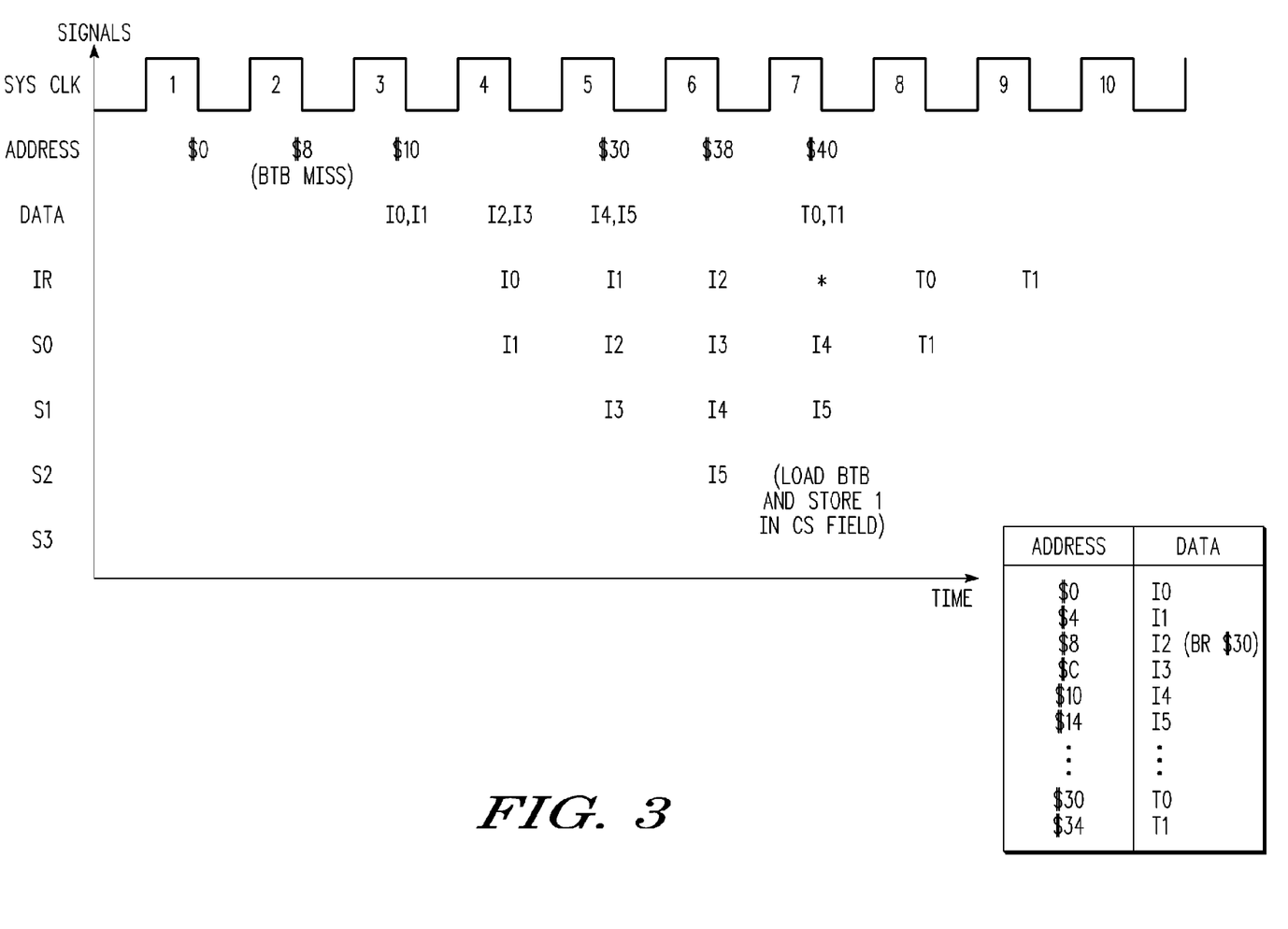
FIGS. 3-5 illustrate timing diagrams according to various examples of the instruction pipeline.

Referring to FIGS. 1 and 3, during the first clock cycle, DCL 164 determines whether two slots are available in instruction buffer 105. When DCL 164 determines that two slots are available in instruction buffer 105 (e.g., instruction register 116 and slot 0), request signal 199 is asserted and the two slots, instruction register 116 and slot 0, are reserved. Request signal 199 is provided to memory 166 from DCL 164 and is used to request the instructions being fetched from memory 166. The instruction address corresponding to the initial instruction being fetched is provided by program counter 112 to MUX 126 via instruction address (IA) 123. DCL 164 uses MUX 126 to select the initial instruction address 123, which is then driven onto address bus 128 to simultaneously request instructions I0 and I1 located at address $0 and address $4 in memory 166 (where a section of example instructions and corresponding instruction addresses are illustrated in table format in the columns labeled address and data, respectively).

The instruction address driven onto address bus 128, $0, is provided to latch 160, comparator 170, and memory 166. Latch 160, which is coupled to address bus 128 and adder 156, captures the instruction address driven onto address bus 128. Adder 156 then increments the current instruction address by the doubleword fetch size, $8. As stated previously, the doubleword fetch size may vary in different embodiments of the present invention and is dependent upon the size of each instruction being fetched and the number of instructions fetched in one request. The capture by latch 160 and the incrementation caused by adder 156 of the address on address bus 128 occur during every clock cycle where there is an address driven onto address bus 128 and a request is made to memory. The incremented address, in this case, $8, is output by adder 156 as sequential instruction address (SIA) 158.

Comparator 170 receives the address driven onto address bus 128 and compares the address to the branch instruction address or addresses, if any, stored in branch target buffer 144. When comparator 170 determines that the address driven onto address bus 128 matches any of the branch instruction addresses stored in BTB 144 and the associated entry is valid, as indicated by the V field, a BTB hit has occurred and comparator 170 asserts BTB hit signals 196. If the branch is also predicted to be taken, comparator 170 asserts comparator match signal 197. Comparator 170 also selects the branch target address corresponding to the branch instruction address that has generated a BTB hit using signal 180 and MUX 154. The selected branch target address is provided to MUX 126 using BTBTA 178. Since comparator match signal 197 is asserted, DCL 164 selects BTBTA 178 and drives the branch target address onto address bus 128.

When comparator 170 determines that the address driven onto address bus 128 does not match any branch instruction address in BTB 144 or the address driven onto bus 128 matches a branch instruction address in BTB 144 but the corresponding entry is invalid, a BTB miss has occurred and BTB hit signals 196 and comparator match signal 197 are deasserted by comparator 170. When comparator match signal 197 is deasserted, DCL 164 does not select BTBTA 178 as the address to be driven onto address bus 128. In the example shown in FIG. 3, a BTB miss has occurred during the first clock cycle, hence, comparator match signal 197 is deasserted and BTBTA 178 is not selected by DCL 164.

During the second clock cycle of FIG. 3, DCL 164 determines whether two slots in instruction buffer 105 are available for storing two instructions. Since two slots are available in prefetch buffer 102, in this case, slot 1 and slot 2, DCL 164 asserts request signal 199, reserves slots 1 and 2, and selects SIA 158. The sequential instruction address, $8, is driven onto address bus 128 and provided to latch 160, comparator 170, and memory 166. Latch 160 captures the instruction address driven onto address bus 128 and adder 156 increments the captured instruction address by $8, yielding a sequential instruction address of $10. Comparator 170 determines whether a BTB hit or a BTB miss has occurred between the address driven onto address bus 128, $8, and the valid branch instruction addresses, if any, in BTB 144. In this case, since there is not a match between the address driven on address bus 128 and any address stored in the branch instruction address portion of BTB 144, a BTB miss occurs and BTB hit signals 196 and comparator match signal 197 are deasserted. The instructions, I2 and I3, corresponding to the sequential instruction address $8 driven onto address bus 128, are fetched and provided to prefetch buffer 102 via bus 168 and data bus 130 during the fourth clock cycle.

During the third clock cycle, instructions I0 and I1, corresponding to the instruction address driven onto address bus 128 during the first clock cycle, are driven onto data bus 130 to be loaded into instruction register 116 and slot 0 of prefetch buffer 102 during the fourth clock cycle. DCL 164 determines that two slots, slots 3 and 4, of prefetch buffer 102 are available to store two instructions from memory 166 and asserts request signal 199, reserves slots 3 and 4, and selects SIA 158. The selected sequential instruction address $10 is driven onto address bus 128 and provided to latch 160, comparator 170, and memory 166. Latch 160 captures the instruction address driven onto address bus 128 and adder 156 increments the captured instruction address, yielding a sequential instruction address of $18. Comparator 170 determines whether a BTB hit or a BTB miss has occurred between the address driven onto address bus 128, $10, and the branch instruction addresses, if any, stored in BTB 144. In this case, since all valid fields of BTB 144 are invalid, a BTB miss occurs, BTB hit signals 196 and comparator match signal 197 are deasserted, and comparator 170 does not select the BTBTA 178 corresponding to the BIA.

During the fourth clock cycle, DCL 164 determines whether two slots in prefetch buffer 102 are available to store two instructions from memory 166. Since, in this case, the three previous fetches during the first three clock cycles (at two instructions per fetch) have filled up or reserved six slots in prefetch buffer 102, two slots are not available to store two additional instructions from memory 166. Hence, request signal 199 is deasserted, no additional slots are reserved, and DCL 164 selects SIA 158. Since SIA 158 is selected, sequential instruction address, $18, is driven onto address bus 128 and provided to latch 160, comparator 170, and memory 166. However, since request signal 199 is deasserted, the instructions corresponding to the instruction address $18 driven onto address bus 128, are not requested during the fourth clock cycle, since two slots are not available in prefetch buffer 102. Comparator 170 receives the non-requested address and, in one embodiment, compares the non-requested address to the entries of BTB 144. DCL 164, however, ignores any comparator match signal 197 sent by comparator 170 when request signal 199 is deasserted. In an alternate embodiment, since no memory request is made, no comparison is made by comparator 170.

Instruction I0, requested during the first clock cycle, is loaded into instruction register 116 and instruction I1, also requested during the first clock cycle, is loaded into slot 0 in cycle 4. Instructions I2 and I3, corresponding to the instruction address $8 driven onto address bus 128 during the second clock cycle, are placed on bus 168 and data bus 130 to be loaded into slot 0 and slot 1 of prefetch buffer 102 at the beginning of the fifth clock cycle.

DCL 164 receives opcode 176 of the instruction I0 from instruction register 116 and determines whether the instruction is a branch instruction. DCL 164 is cognizant of the opcodes of the branch instructions being used in data processing system 100 and is able to compare the received opcode 176 to the opcodes of processor 184. When DCL 164 determines that the instruction I0 in instruction register 116 is not a branch instruction, DCL 164 uses opcode 190 of the instruction I1 in slot 0 to determine whether the instruction loaded into slot 0 is a branch instruction. When DCL 164 determines that there is not a branch instruction in instruction register 116 or in slot 0 of prefetch buffer 102, the current cycle ends without branch processing and processor 184 continues to the fifth clock cycle.

During the fifth clock cycle, DCL 164 determines whether two slots in prefetch buffer 102 are available to store two instructions from memory 166. Since two slots are available, in this case, slot 4 and slot 5, request signal 199 is asserted and slots 4 and 5 are reserved. Instructions I4 and I5, corresponding to the instruction address $10 driven onto address bus 128 during the third clock cycle, are placed on bus 168 and data bus 130 to be loaded into slot 1 and slot 2 of prefetch buffer 102 during the sixth clock cycle. Instruction I0, present in instruction register 116 during the fourth clock cycle, is replaced with instruction I1 from slot 0. Instructions I2 and I3, requested during the second cycle, are loaded into slot 0 and slot 1, respectively. As instructions are executed, subsequent instructions are shifted forward (toward the instruction register 116) into the next slot. Instructions fetched from memory may not necessarily be loaded into the slots reserved at the time a request was made to perform the fetch, since instructions in the prefetch buffer may be proceeding forward toward instruction register 116 as earlier instructions are executed. Instead, they are loaded into the proper slots corresponding to the progression of instructions which precede them.

The opcodes 176 and 190 of instructions I1 and I2 loaded into instruction register 116 and slot 0 are provided to DCL 164. DCL 164 receives opcode 176 of the instruction I1 stored in instruction register 116 and determines whether the instruction is a branch instruction. When DCL 164 determines that the instruction I1 located in instruction register 116 is not a branch instruction, DCL 164 uses opcode 190 to determine whether the instruction I2 in slot 0 is a branch instruction.

When DCL 164 determines that the instruction loaded into slot 0 is a branch instruction (BR $30), DCL 164 determines whether BTB hit signals 196 were asserted, indicating a BTB hit. When DCL 164 determines that BTB hit signals 196 are deasserted (indicating a BTB miss), which is the case in FIG. 3, DCL 164 determines whether a condition for stall signal in DCL 164 is asserted. The condition for stall signal in DCL 164 indicates whether processor 184 has stalled for reasons related to, for example, an execution dependency of an instruction on a prior instruction. When DCL 164 determines that a condition for stall signal in DCL 164 is deasserted, which is the case in FIG. 3, branch address calculator 108 uses the displacement of the branch instruction in slot 0 and the output of program counter 112 to generate slot 0 target address (S0TA) 124, which is used to prefetch the branch instruction's target address. DCL 164 then selects S0TA 124 using MUX 126 to drive to the branch target address, $30, onto address bus 128. The target instruction, T0, stored at the branch target address is then returned via bus 168 and data bus during the seventh clock cycle, along with the next sequential instruction, T1. In this case, an entry in the BTB will be allocated for the branch if it is resolved to be taken, so that on a subsequent encounter of the branch instruction, a BTB hit may occur, and the branch target fetch may occur two cycles earlier, without waiting for branch address calculator 108 to generate the S0TA value.

During the sixth clock cycle, the branch instruction, I2, that was in slot 0 during the fifth clock cycle, is loaded into instruction register 116, instruction I3 is loaded into slot 0 from slot 1, I4 is loaded into slot 1 from data bus 130, and I5 is loaded into slot 2 from data bus 130. DCL 164 uses opcode 176 to determine whether instruction I2 in instruction register 116 is a branch instruction. Once the branch instruction I2 is resolved to be a taken branch instruction, DCL 164 determines whether or not an entry in BTB 144 will be allocated for the branch. Any of the factors discussed above can be used by DCL 164 to make the determination of whether or not to allocate an entry. In one embodiment, BTB 144 has available entries where there is no need to replace an existing valid entry; in which case an entry can be allocated for I2 without incurring any penalties. Note that control circuitry 172 uses lines 173 to identify which slot in BTB 144 is used to store the branch instruction address and the branch target address. If an entry is allocated, the instruction address for I2 and the branch target address for I2 can be provided to BTB 144 via PC 110 and IRTA 120, respectively, and the valid field in BTB 144 associated with the loaded entry is asserted. Also, the PRED field of the allocated entry can be set to an initial default state, such as, for example, state 10, indicating WT, and a cycle saving value associated with allocating a location in BTB 144 for I2 can be provided via BTB Entry Information 175.

In the illustrated embodiment, DCL 164 counts the number of cycles from the time that the branch instruction (I2) can leave instruction register 116 (which is at the end of cycle 6) to the time that the target instruction (T0) can leave instruction register 116 (which is at the end of cycle 8). This number is 2. Had there been a BTB hit, though, as is the case in FIG. 4, the number of cycles from the time that the branch instruction (I2) can leave instruction register 116 (which is at the end of cycle 6) to the time that the target instruction (T0) can leave instruction register 116 (which is at the end of cycle 7) is only 1. Therefore, a savings of 1 cycle (2 cycles−1 cycle=1 cycle) would be realized upon a subsequent fetch of branch instruction I2 if branch instruction I2 were present in BTB 144. Therefore, assuming DCL 164 determines that branch instruction I2 is to be allocated in BTB 144, a value of 1 would be stored in the CS field of the identified entry for allocation.

DCL 164, in one embodiment, uses this cycle savings information of 1 to make the determination of whether or not to allocate. For example, in one embodiment, so long as the cycle savings is one or more cycles, an entry may be allocated. Furthermore, if a valid entry already exists in the entry identified for allocation, by control circuitry 172 then, in one embodiment, DCL would compare the savings of 1 cycle (which would be realized by storing I2 into BTB 144) to the cycle savings value stored in the CS field of the valid entry already in the identified entry in order to determine whether I2 will replace the existing entry. Alternatively, as was discussed above, other factors in addition to or in place of cycle saving information, such as the prediction state of the identified valid entry to be replaced, may be used to determine whether or not to allocate an entry for branch instruction I2 in BTB 144.

Figure 4:
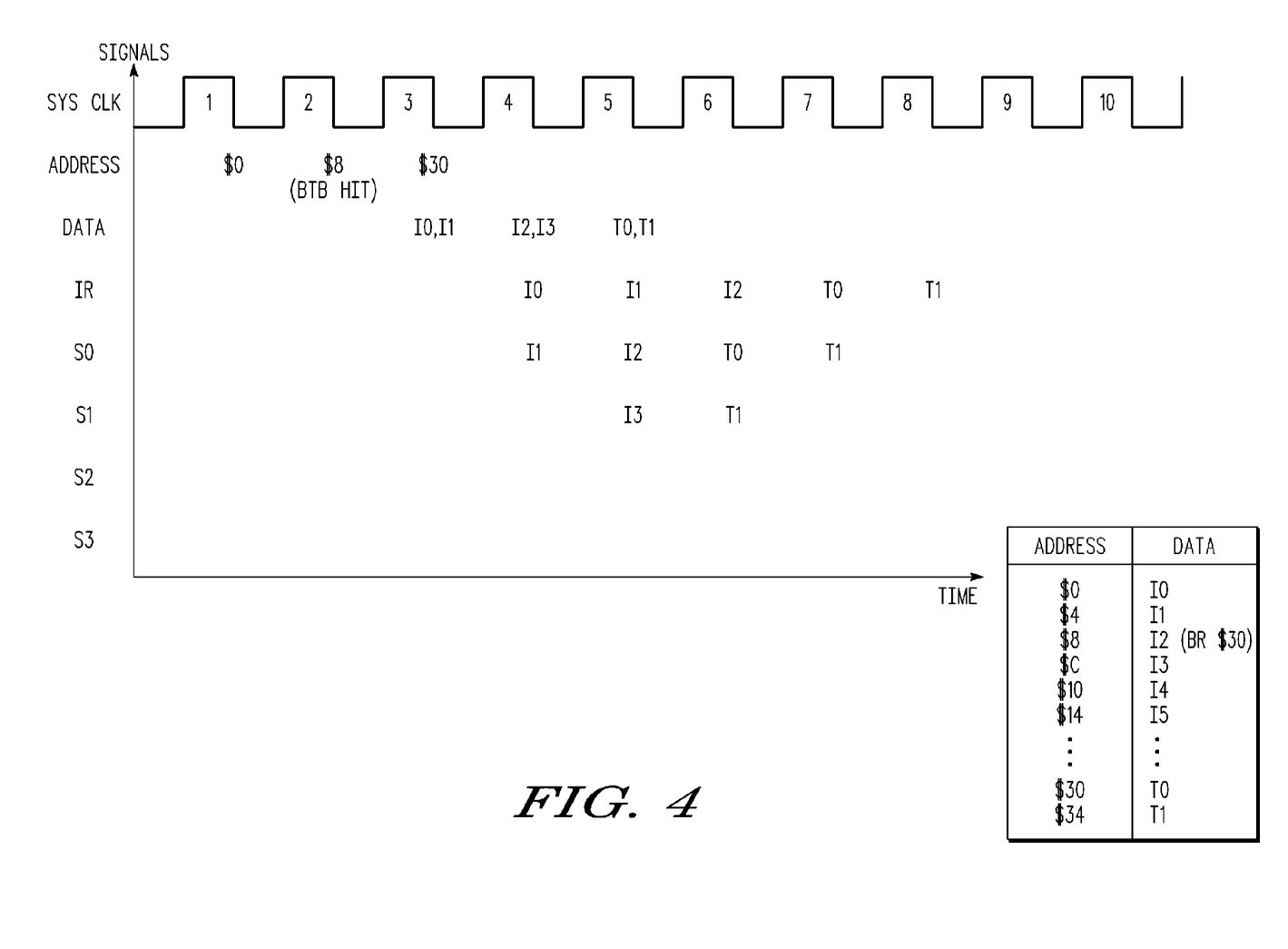

Therefore, referring to FIG. 4, when, during clock cycle 5, DCL 164 determines that I2 in slot 0 is a branch instruction, DCL 164 determines that comparator match signal 197 was previously asserted for the address of I2 in clock cycle 2, indicating a hit in BTB 144, and BTBTA 178 was selected by DCL 164 in clock cycle 3 to be driven on address bus 128. In this case, an entry for the branch instruction I2 is not allocated in BTB 144 since it is already present in BTB 144.

Referring back to FIG. 3, during the seventh cycle, instructions T0 and T1, corresponding to the branch target address, $30, requested during the fifth clock cycle, are returned on data bus 130. Since during the sixth clock cycle, instruction I2 was decoded as a taken branch instruction, any instructions loaded into instruction register 116, slot 0, slot 1, etc. after the branch instruction has been decoded but before the branch target instructions are loaded into instruction buffer 105 are discarded and are not decoded by DCL 164 during the seventh cycle, resulting in a stall condition in processor 184 (as indicated by the asterix in the seventh cycle) and I3, I4, and I5 are flushed out.

During the eighth clock cycle, instructions T0 and T1, corresponding to the branch target address in memory 166, are loaded into instruction register 116 and slot 0 of prefetch buffer 102, respectively. Similarly, during the ninth clock cycle, instruction T1 from slot 0 is loaded into IR 116, etc. and DCL 164 performs the operations described above for the previous clock cycles.

Sequential instruction fetching of the target stream (not shown) continues in FIG. 3. For example, address $38 is driven onto address bus 128 in cycle 6 and address $40 is driven onto address bus 128 in cycle 7.

In one embodiment, as shown in FIGS. 1 and FIG. 4, BTB 144 has been previously loaded with a valid entry corresponding to instruction I2. BTB 144 includes the branch instruction address $8 loaded in a BIA slot, the branch target address $30 loaded in a corresponding BTA slot, and the associated valid bit is asserted. During the first clock cycle, instruction register 116 and slot 0 are reserved, and address $0 is driven onto address bus 128 to request instructions I0 and I1 located at address $0 and address $4 in memory 166. Comparator 170 also receives the address $0 that was driven onto address bus 128 and determines whether address $0 hits in BTB 144. In the current example, it is assumed that address $0 does not hit (i.e. misses) in BTB 144.

During the second clock cycle, slots 1 and 2 are reserved, and the sequential instruction address, $8, is driven onto address bus 128. Comparator 170 also receives $8 and determines whether address $8 hits in BTB 144. In the current example, it is assumed that address $8 does hit in BTB 144. Therefore, comparator 170 asserts BTB hit signals 196 and comparator match signal 197. Comparator 170 then selects the branch target address, $30, from the entry which caused the BTB hit. The selected branch target address is provided to MUX 126 using branch target buffer target address (BTBTA) 178.

During the third clock cycle, instructions I0 and I1, corresponding to the instruction address driven onto address bus 128 during the first clock cycle, are driven onto data bus 130 to be loaded into instruction register 116 and slot 0 of prefetch buffer 102 during the fourth clock cycle. Also, in the third clock cycle, slots 3 and 4 of prefetch buffer 102 are reserved, and the branch target address, $30, is driven onto address bus 128. Comparator 170 also receives address $30 and determines whether it hits in BTB 144. In this example, it is assumed that $30 misses in BTB 144.

During the fourth clock cycle, instructions I0 and I1 are provided to instruction register 116 and S0, respectively. Sequential instruction fetching of the target stream (not shown) continues from this point on in FIG. 4.

During the fifth clock cycle, instructions T0 and T1, corresponding to the branch instruction address driven onto address bus 128 during the third clock cycle, $30, are driven onto data bus 130 to be loaded into slot 0 and slot 1 of prefetch buffer 102 during the sixth clock cycle. Instruction I1, that was in slot 0 during the fourth clock cycle, is loaded into IR 116. Instructions I2 and I3, that were on data bus 130 during the fourth clock cycle, are loaded into slot 0 and slot 1, respectively. During the sixth clock cycle, the branch instruction I2 is loaded into IR 116 for execution. During the seventh clock cycle, the new target stream has been established, and execution of T0 begins without a processor 184 stall between executing I2 and T0.

In one embodiment of the present invention, the sequence of code and timing diagram shown in FIG. 3 can be viewed as a portion of the first iteration of a loop containing the segment of code listed in FIG. 3. FIG. 4 can be viewed as a portion of all subsequent iterations of the same loop shown in FIG. 4, where the BTB entry for branch instruction address $8 and branch target address $30 were loaded during the first iteration of the loop as shown in FIG. 4. Therefore, note that having allocated an entry for branch instruction address $8 (for instruction I2), a processor cycle was saved. However, note that if the entry that was replaced by branch instruction address $8 provided a greater number of cycle savings (such as 2 or more) by being in the BTB 144, then, in FIG. 3, the branch instruction address $8 may not have been allocated into BTB 144, even though it could save one cycle.

Figure 5:
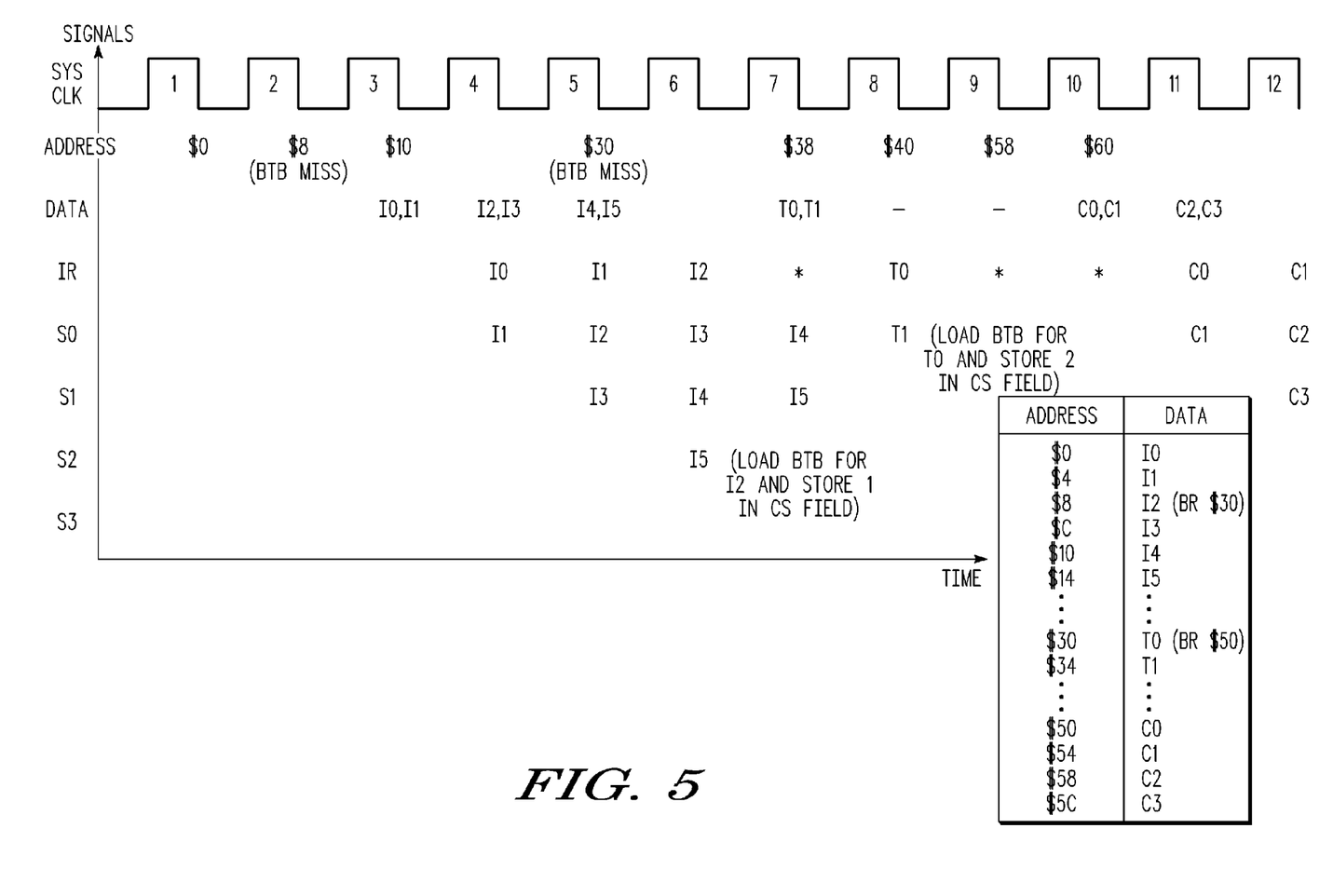

In one embodiment, as shown in FIG. 1 and FIG. 5, BTB miss may result in two processor cycle stalls. In the example of FIG. 5, it is assumed that addresses $8 and $30 are not stored within BTB 144, thus resulting in BTB misses. Note that the descriptions for clock cycles 1-7 are the same as was described above in reference to FIG. 3 and therefore will not be repeated now.

Referring to cycle 8 in the example of FIG. 5, the target instructions (T0 and T1) of address $30 provided in cycle 5, are loaded into instruction register 116 and slot 0, respectively. Since address $30 missed in BTB 144, it was not determined that $30 corresponded to a branch instruction until it was examined in slot 0 by DCL 164. Therefore, S0TA 124 (generated by branch address calculator 108) was selected by DCL 164 using MUX 126 to drive the branch target address, $30, onto address bus 128. The target instruction, T0, stored at the branch target address is then returned via data bus 168 during the seventh clock cycle, along with the next sequential instruction, T1. Therefore, they are not loaded into instruction register 116 and slot 0 until cycle 8. Since instruction T0 is the target of a branch instruction, it is loaded directly in instruction register 116 since a change of flow is occurring. In the current example of FIG. 5, though, note that instruction T0 is also a branch instruction (BR $50).

Since T0 is loaded directly into instruction register 116, it is already in instruction register 116 when it is known that it is a branch instruction. That is, the branch lookahead scheme was unable to determine it was a branch instruction any earlier because it never went to slot 0. Therefore, branch address calculator 108 provides $50 as IRTA 120 via MUX 126 to address bus 128 in cycle 8. The target instruction, C0, of instruction T0 (along with the subsequent sequential instruction C1) is not returned to the data bus until cycle 10, and thus C0 and C1 are not loaded into instruction register 116 and slot 0 until cycle 11. This results in two processor stalls in which instruction register 116 is waiting to receive the target instruction stream beginning with C0.

Note that if instruction T0 (BR $50) was stored in BTB 144, a BTB hit would have occurred in cycle 5, rather than a BTB miss, and the target address of T0, $50, would have been driven onto address bus 128 in cycle 6, in which case C0 and C1 would have been returned on the data bus in cycle 8 and loaded into instruction registers 116 and slot 0 in cycle 9. Had this occurred, note that no processor stalls would have occurred, since T0 is present in instruction register 116 in cycle 8 and C0 would have shown up in instruction register 116 in cycle 9, rather than in cycle 11 (as occurred in the example of FIG. 5). That is, having had instruction T0 stored in BTB 144 would have resulted in a cycle savings of 2 data processor cycles, since no processor stall cycles would have occurred between T0 and C0. Therefore, in the example of FIG. 5, once T0 is actually resolved to be a taken branch (which occurs in cycle 8), it is loaded into BTB 144 in the next cycle (cycle 9) with a value of 2 stored in its corresponding CS field. In one embodiment, this allocation of T0 into BTB 144 may not have occurred, if, for example, the branch instruction in the existing entry were to offer a greater cycle savings than 2. (Also, as described above in reference to FIG. 3, note that I2 may also have been loaded into BTB 144 in cycle 7, after having been resolved as actually taken in cycle 6, with a value of 1 stored in its corresponding CS field. That is, as was described above in reference to FIGS. 3 and 4, having had I2 stored in BTB 144 would have resulted in a savings of 1 data processor cycle.)

Sequential instruction fetching of the target stream starting at $50 then continues in FIG. 5 (where further details of this are not shown). For example, address $58 is driven onto address bus 128 in cycle 9 and address $60 is driven onto address bus 128 in cycle 10.

In one embodiment, as illustrated in FIG. 1, an additional postponement flag (PF) may be stored for each entry in BTB 144 which can further be used to make allocation decisions. The PF can be used to indicate whether or not replacement of the BTB entry was postponed since the last time the branch was taken. In this case, the next time the BTB entry is a candidate for allocation on a BTB miss, replacement of this entry may occur anyway. That is, even though an allocation of a particular entry would normally not occur, if the PF is set to 1, the entry may be allocated regardless. In one embodiment, the PF is a 1-bit flag that, when set, indicates that replacement of that entry was postponed since the last time the branch was taken. (Note that, in one embodiment, a PF may be stored for only a subset of the entries in BTB 144 and not every entry in BTB 144.)

For example, for a particular branch instruction which missed in BTB 144 and was later resolved as taken, a decision is made whether or not to allocate an entry for the branch in BTB 144. In one embodiment, table 201 of FIG. 6 is used to make the allocation decision, where both the relative cycle savings and the state of the predictor of the entry in BTB 144 that is to be replaced are used to determine if allocation (i.e. replacement) occurs.

In one embodiment using a PF, if the entry is determined to not be replaced (i.e. the new branch instruction is not allocated into BTB 144), then the PF of that entry of BTB 144 that was to be replaced is set to "1". Therefore, the next time that entry is selected for allocation (assuming its PF is still set to "1"), then regardless of what table 201 of FIG. 6 indicates, the allocation would occur and that entry would be replaced. That is, PF can be used to selectively override a replacement decision defined by the predetermined allocation criteria (such as by the allocation criteria provided by table 201). Alternatively, if that entry is selected for allocation (assuming its PF is still set to "1"), then an alternate decision table may be used, such as allocation decision table 210 of FIG. 7. This alternate decision table may, for example, allow for allocation to occur under more conditions. Also, in one embodiment, the PF of a particular entry is cleared if a BTB hit of that entry occurs, indicating that the branch corresponding to the entry may be taken. In an alternate embodiment, the PF flag of a hitting entry is only cleared if the branch corresponding to that entry is actually taken. Note that some embodiments may utilize an allocation table, such as the allocation tables of FIG. 6 or FIG. 7, without utilizing a PF flag. In those embodiments, postponement may always occur for some combinations in the table.

Figure 7:
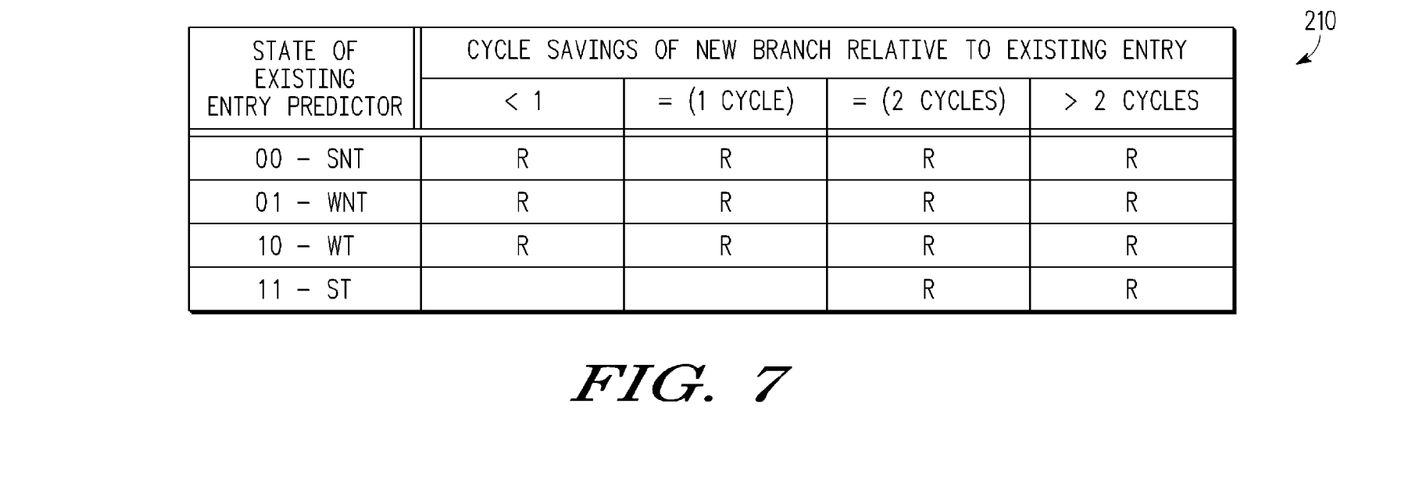

FIG. 7 also illustrates an allocation decision table, which, like table 201 of FIG. 6, uses both relative cycle savings as well as the predictor state of the entry to be replaced to determine whether to allocate a new entry or not. However, note that in the case of FIG. 7, the entry identified for allocation would almost always be replaced, unless its predictor state indicates ST with no relative cycle savings or its predictor state indicates ST with a cycle savings of 1. Therefore, table 210 of FIG. 7 allows allocation to occur under more conditions than table 201 of FIG. 6. Therefore, in one embodiment, when an entry is identified for allocation (i.e. replacement) and its PF is set to 0, then the criteria of table 201 of FIG. 6 may be used to determine whether the allocation occurs. However, if the PF of the entry identified for allocation is set to 1, then the criteria of table 210 of FIG. 7 may be used to determine whether allocation occurs.

In one embodiment, each of tables 201 and 210 provide BTB replacement decisions based on particular criteria. For example, for a particular value of the relative cycle savings and a particular value of the predictor state, a replacement decision of whether to replace an identified entry in the BTB is provided by each of tables 201 and 210. Therefore, each replacement decision of table 201 or 210 has a value which indicates whether, under a particular criterion (i.e. particular values of the factors being used), replacement or allocation is to occur. Therefore, a first set of BTB replacement decision can be used if the PF has a first value (e.g. the BTB replacement decisions of table 201) and a second set of BTB replacement decisions can be used if the PF has a second value (e.g. the BTB replacement decisions of table 210).

In one embodiment, each of the tables of FIGS. 6 and 7 may be set up differently, using different factors, as was discussed in more detail above. For example, they may include a single row or a single column, in which only one factor is used to determine whether allocation occurs. Alternatively, the tables may be set up using different factors for replacement. Also, they may each be programmable, where, for example, the replacement decisions of each table may be programmable. For example, the tables may be programmed by a user or based on software profiling. Also, in one embodiment, an allocation decision table may be used to determine if allocation occurs when the PF of the entry to be replaced is 0, while allocation may always be performed, regardless of any criteria, if the PF of the entry to be replaced is 1. Therefore, a second table, such as the table of FIG. 7, may not be needed. Also, note that each of the tables of FIGS. 6 and 7 may be implemented in a variety of ways within DCL 164 (e.g. as a look-up table, as combinational logic, as a state machine, etc.). Also, DCL 164 can provide information to CTRL 172 (which updates allocated entries in BTB 144) with respect to setting or clearing the PF of an entry via replacement flag control signal 177. Therefore, note that a first set of criteria can be used to determine whether replacement of an identified entry occurs when PF has a first value and a second set of criteria can be used to determine whether replacement of the identified entry occurs when PF has a second value, different from the first value. Note that the second set of criteria can indicate to always replace.

In another embodiment, the PF for each entry may be implemented as a count value. For example, the PF may be a 2-bit count value such that replacement of an entry can be postponed more than once since the last time the branch of that entry was taken. In one embodiment, when an entry to be replaced has a PF count value of 0 (which is the initial value of the PF of an entry, or the value upon that entry resulting in a hit in BTB 144, or, in another embodiment, the value upon that entry resulting in a BTB hit for a taken branch), then table 201 of FIG. 6 may be used to determine whether the entry which has been identified for allocation is to be replaced. In this example, when the entry to be replaced has a PF count value of 1, then table 210 of FIG. 7 may be used to determine whether the entry which has been identified for allocation is to be replaced. In this example, when the entry to be replaced has a PF count value of 2 or more, then the determination may be to replace the entry regardless of any criteria. In this example, each time an allocation decision is made to not replace an identified entry, then DCL 164, via replacement flag control 177, can increment the value of the corresponding PF by one. Also, each time an entry results in a hit, or, alternatively, in a hit which results in a taken branch, then the PF count value can be cleared back to 0. Therefore, in the case of using a multi-bit PF, a first set of criteria can be used to determined whether replacement of an identified entry occurs when PF has a first value or range of values, a second set of criteria can be used to determine whether replacement of the identified entry occurs when PF has a second value or range of values, and a third set of criteria can be used to determine whether replacement of the identified entry occurs when PF has a third value or range of values. Note that each of the first, second, and third values or range of values may be mutually exclusive. Also, note that the third set of criteria can indicate to always replace (regardless of any criteria).

In one embodiment, the determination as to whether to set the PF (or increment the PF) of a particular entry can be made based on the predictor state of the entry. For example, in a BTB having an allocation policy in which all taken branches are allocated, the PF of an entry to be replaced can be set to "0" if its predictor indicates ST. In this manner, the allocation policy to always allocate on taken branches is selectively overridden by some BTB entries to allow the replacement of the identified entry for allocation to be postponed at least once. Alternatively, when a BTB hit occurs, and the branch is not taken, the PF flag of the existing entry may be set to "1" to preclude postponement in the future if the entry is selected for allocation prior to the entry's branch being taken again. Therefore, the PF can be used to postpone allocation in a variety of ways and for a variety of reasons.

By now it should be appreciated that there has been provided a method for improved allocation in which a decision on whether to allocate or not can be made based on a variety of different factors. In one embodiment, these factors include information on an entry which is identified to be replaced by the allocation. For example, this factor may include the predictor state of the identified entry to be replaced. In one embodiment, the criteria for determining allocation may include cycle savings information (processor or clock cycle savings information) with respect to the new branch instruction to be stored in the entry for allocation or may include relative cycle savings information between the new branch to be stored in the BTB and the branch to be replaced. Therefore, in one embodiment, cycle savings information is stored for each branch that is stored into the BTB. Also, in one embodiment, a postponement flag can be used to postpone allocation so as not to remove possibly useful entries from the BTB. For example, based on a value of the postponement flag, a replacement decision made according to predetermined allocation criteria (based on one or more different factors, such as, for example, the allocation criteria provided in table 201 or table 210) can be selectively overridden.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Furthermore, note that FIG. 1 may illustrate only a portion of processor 12, where processor 12 may include other known circuit elements, such as, for example, execution units, register files, etc.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 10 may include any number of separate integrated circuits or separate devices interconnected with each other. For example, memory 166 may be located on a same integrated circuit as processor 184 or on a separate integrated circuit or located within another peripheral or slave discretely separate from other elements of system 10. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, criteria other than those set forth above may be used to determine whether or not to replace an existing entry upon allocation. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text:

1. A method for branch target buffer (BTB) allocation in a pipelined data processing system, comprising:
   receiving a branch instruction and determining a branch target address corresponding to the branch instruction;
   determining whether the branch target address is presently stored in a branch target buffer (BTB), wherein when the branch target address is not presently stored in the branch target buffer, identifying an entry in the branch target buffer as an identified entry to receive the branch target address; and
   using a value in a field within the identified entry in the branch target buffer to selectively override a replacement decision defined by predetermined branch target buffer allocation criteria.

2. The method of statement 1 further comprising:
   storing the branch target address within the identified entry in response to the value in the field.

3. The method of statement 1 further comprising:
   using a first replacement value within a first set of replacement decisions when the value assumes a first value to thereby determine whether to selectively override the replacement decision; and
   using a second replacement value within a second set of replacement decisions that is different from the first set of replacement decisions when the value assumes a second value to thereby determine whether to selectively override the replacement decision.

4. The method of statement 3 further comprising:
   always replacing the identified entry with the branch target address in response to determining that a branch is taken and the value in the field within the identified entry has a predetermined value.

5. The method of statement 3 further comprising:
   implementing the second set of replacement decisions to always allocate the identified entry in the branch target buffer to receive the branch target address.

6. The method of statement 3 further comprising:
   counting a number of times that postponement of the identified entry in the branch target buffer occurs to form the value as a count value; and
   when the count value reaches a predetermined number, always allocating the identified entry in the branch target buffer if a branch is taken.

7. The method of statement 3 further comprising:
   making the first set of replacement decisions and the second set of replacement decisions user programmable, the first set of replacement decisions and the second set of replacement decisions being represented in a table.

8. The method of statement 1 further comprising:
   when the branch target address is presently stored within the branch target buffer, clearing the value in the field corresponding to the entry storing the branch target address if a branch is taken.

9. A system comprising:
   branch address circuitry for forming a branch target address corresponding to an instruction;
   a branch target buffer (BTB) having a plurality of entries, at least one of the plurality of entries having a postponement flag field comprising a value for indicating whether the at least one of the plurality of entries has previously not been allocated with a new branch target address; and
   control logic circuitry coupled to the branch address circuitry and the BTB for determining whether the branch target address is stored in the BTB, the control logic circuitry identifying an allocation entry in the BTB for allocation to receive the branch target address in response to a miss in the BTB, the control logic circuitry allocating the entry using a first branch target buffer allocation criteria based on a first value of the postponement flag field and using a second branch target buffer allocation criteria based on a second value of the postponement flag field.

10. The system of statement 9 wherein the control logic circuitry further comprises logic that allocates the entry by determining whether to replace the identified entry using the first branch target buffer allocation criteria based on the first value of the postponement flag and using the second branch target buffer allocation criteria based on the second value of the postponement flag field.

11. The system of statement 9 further comprising:
    a first programmable table for storing the first branch target buffer allocation criteria to be used in response to the first value of the postponement flag; and
    a second programmable table for storing the second branch target buffer allocation criteria to be used in response to the second value of the postponement flag.

12. The system of statement 9 wherein the postponement flag field further comprises:
    at least two bits wherein a first field value represents the value for indicating whether the at least one of the plurality of entries has previously not been allocated with the new branch target address, a second field value represents the value for indicating use of the second branch target buffer allocation criteria, and a third field value indicates that the entry must be allocated.

13. The system of statement 9 wherein the postponement flag field further comprises:
    at least two bits wherein a first range of values indicates that the first branch target buffer allocation criteria is used to determine allocation of the entry, a second range of values indicates that the second branch target buffer allocation criteria is used to determine allocation of the entry, and a third range of values indicates that a third branch target buffer allocation criteria is used to determine allocation of the entry.

14. A method comprising:
    receiving a branch instruction at an input of a processor;
    determining a branch target address corresponding to the branch instruction;
    determining whether the branch target address is presently stored in a branch target buffer (BTB), wherein when the branch target address is not presently stored in the branch target buffer, identifying an entry in the branch target buffer as an identified entry to receive the branch target address; and
    using a postponement flag corresponding to the identified entry to indicate whether or not replacement of the entry that was identified was postponed since a branch associated with the entry was last taken.

15. The method of statement 14 further comprising:
using a first set of branch target buffer replacement decisions when the postponement flag assumes a first value; and
using a second set of branch target buffer replacement decisions that is different from the first set of branch target buffer replacement decisions when the postponement flag assumes a second value.

16. The method of statement 15 further comprising:
implementing the second set of branch target buffer replacement decisions to always allocate the identified entry in the branch target buffer to receive the branch target address if a branch is taken.

17. The method of statement 15 further comprising:
making the first set of branch target buffer replacement decisions and the second set of branch target buffer replacement decisions programmable, the first set of branch target buffer replacement decisions and the second set of branch target buffer replacement decisions are represented in a table.

18. The method of statement 14 further comprising:
always replacing the identified entry in the branch target buffer with the branch target address in response to determining that the value of the postponement flag has a predetermined value.

19. The method of statement 14 further comprising:
counting a number of times that postponement of the identified entry occurs to form the postponement flag as a count value; and
when the count value reaches a predetermined number, always allocating the identified entry if a branch is taken.

20. The method of statement 14 further comprising:
implementing the postponement flag with at least two bits, wherein a first range of values provided by the at least two bits indicates that a first branch target buffer allocation criteria is used to determine allocation of the identified entry, a second range of values provided by the at least two bits indicates that a second branch target buffer allocation criteria is used to determine allocation of the identified entry, and a third range of values provided by the at least two bits indicates that a third branch target buffer allocation criteria is used to determine allocation of the entry.

What is claimed is:

1. A method for branch target buffer (BTB) allocation in a pipelined data processing system, comprising:
receiving a branch instruction and determining a branch target address corresponding to the branch instruction;
determining whether the branch instruction hits or misses in a branch target buffer (BTB), wherein when the branch instruction results in a miss in the branch target buffer, identifying an entry in the branch target buffer as an identified entry to receive the branch target address; and
using a value in a field within the identified entry in the branch target buffer to selectively override a replacement decision defined by predetermined branch target buffer allocation criteria, wherein the replacement decision indicates whether or not to allocate the identified entry to store information of the branch instruction which resulted in the BTB miss, wherein the information of the branch instruction includes the branch target address.

2. The method of claim 1 further comprising:
storing the information of the branch instruction within the identified entry in response to the value in the field.

3. The method of claim 1 further comprising:
using a first replacement value within a first set of replacement decisions when the value assumes a first value to thereby determine whether to selectively override the replacement decision; and
using a second replacement value within a second set of replacement decisions that is different from the first set of replacement decisions when the value assumes a second value to thereby determine whether to selectively override the replacement decision.

4. The method of claim 3 further comprising:
always storing the information of the branch instruction into the identified entry in response to determining that a branch is taken and the value in the field within the identified entry has a predetermined value.

5. The method of claim 3 further comprising:
implementing the second set of replacement decisions to always allocate the identified entry in the branch target buffer to store the information of the branch instruction.

6. The method of claim 3 further comprising:
counting a number of times that postponement of the identified entry in the branch target buffer occurs to form the value as a count value; and
when the count value reaches a predetermined number, always allocating the identified entry in the branch target buffer to store the information of the branch instruction if a branch is taken.

7. The method of claim 3 further comprising:
making the first set of replacement decisions and the second set of replacement decisions user programmable, the first set of replacement decisions and the second set of replacement decisions being represented in a table.

8. The method of claim 1 further comprising:
when the branch target address is presently stored within the branch target buffer, clearing the value in the field corresponding to the entry storing the branch target address if a branch is taken.

9. A system comprising:
branch address circuitry for forming a branch target address corresponding to an instruction;
a branch target buffer (BTB) having a plurality of entries, at least one of the plurality of entries having a postponement flag field comprising a value for indicating whether the at least one of the plurality of entries has previously not been allocated with a new branch target address; and
control logic circuitry coupled to the branch address circuitry and the BTB for determining whether the branch target address is stored in the BTB, the control logic circuitry identifying an allocation entry in the BTB for allocation to receive the branch target address in response to a miss in the BTB, the control logic circuitry allocating the entry using a first branch target buffer allocation criteria based on a first value of the postponement flag field and using a second branch target buffer allocation criteria based on a second value of the postponement flag field.

10. The system of claim 9 wherein the control logic circuitry further comprises logic that allocates the entry by determining whether to replace the identified entry using the first branch target buffer allocation criteria based on the first value of the postponement flag and using the second branch target buffer allocation criteria based on the second value of the postponement flag field.

11. The system of claim 9 further comprising:
a first programmable table for storing the first branch target buffer allocation criteria to be used in response to the first value of the postponement flag; and a second programmable table for storing the second branch target buffer allocation criteria to be used in response to the second value of the postponement flag.

12. The system of claim 9 wherein the postponement flag field further comprises:
at least two bits wherein a first field value represents the value for indicating whether the at least one of the plurality of entries has previously not been allocated with the new branch target address, a second field value represents the value for indicating use of the second branch target buffer allocation criteria, and a third field value indicates that the entry must be allocated.

13. The system of claim 9 wherein the postponement flag field further comprises:
at least two bits wherein a first range of values indicates that the first branch target buffer allocation criteria is used to determine allocation of the entry, a second range of values indicates that the second branch target buffer allocation criteria is used to determine allocation of the entry, and a third range of values indicates that a third branch target buffer allocation criteria is used to determine allocation of the entry.

14. A method comprising:
receiving a branch instruction at an input of a processor;
determining a branch target address corresponding to the branch instruction;
determining whether the branch instruction hits or misses in a branch target buffer (BTB), wherein when the branch instruction results in a miss in the branch target buffer, identifying an entry in the branch target buffer as an identified entry to receive the branch target address; and
using a postponement flag corresponding to the identified entry to indicate whether or not replacement of the entry that was identified was postponed since a branch associated with the entry was last taken.

15. The method of claim 14 further comprising:
using a first set of branch target buffer replacement decisions when the postponement flag assumes a first value; and
using a second set of branch target buffer replacement decisions that is different from the first set of branch target buffer replacement decisions when the postponement flag assumes a second value.

16. The method of claim 15 further comprising:
implementing the second set of branch target buffer replacement decisions to always allocate the identified entry in the branch target buffer to receive the branch target address if a branch is taken.

17. The method of claim 15 further comprising:
making the first set of branch target buffer replacement decisions and the second set of branch target buffer replacement decisions programmable, the first set of branch target buffer replacement decisions and the second set of branch target buffer replacement decisions are represented in a table.

18. The method of claim 14 further comprising:
always replacing the identified entry in the branch target buffer with the branch target address in response to determining that the value of the postponement flag has a predetermined value.

19. The method of claim 14 further comprising:
counting a number of times that postponement of the identified entry occurs to form the postponement flag as a count value; and
when the count value reaches a predetermined number, always allocating the identified entry if a branch is taken.

20. The method of claim 14 further comprising:
implementing the postponement flag with at least two bits, wherein a first range of values provided by the at least two bits indicates that a first branch target buffer allocation criteria is used to determine allocation of the identified entry, a second range of values provided by the at least two bits indicates that a second branch target buffer allocation criteria is used to determine allocation of the identified entry, and a third range of values provided by the at least two bits indicates that a third branch target buffer allocation criteria is used to determine allocation of the entry.

* * * * *